(12) United States Patent
Haik

(10) Patent No.: US 8,057,776 B2
(45) Date of Patent: Nov. 15, 2011

(54) PROCESS TO PRODUCE CARBON NANOTUBES FROM MICROALGAE

(75) Inventor: Yousef Haik, Greensboro, NC (US)

(73) Assignee: United Arab Emirates University, Al Ain (AE)

(*) Notice: Subject to any disclaimer, the term of this patent is extended or adjusted under 35 U.S.C. 154(b) by 0 days.

(21) Appl. No.: 12/647,439

(22) Filed: Dec. 26, 2009

(65) Prior Publication Data
US 2011/0158893 A1   Jun. 30, 2011

(51) Int. Cl.
*D01F 9/12* (2006.01)
(52) U.S. Cl. .......... 423/447.1; 423/445 B; 977/742; 977/842
(58) Field of Classification Search ........... 423/447.1, 423/447.3, 445 B; 977/742, 843, 842
See application file for complete search history.

(56) References Cited

U.S. PATENT DOCUMENTS

| 7,625,544 | B2 | 12/2009 | Liu et al. |
| 7,635,867 | B2 | 12/2009 | Graham et al. |

OTHER PUBLICATIONS

Generation and Characterization of Inorganic and Organic Nanotubes on Bioengineered Flagella of Mesophilic Bacteria Kumara, Mudalige Thilak I Muralidharan, Subra I Tripp, Brian C Journal of Nanoscience and Nanotechnology [J. Nanosci. Nanotechnol.]. vol. 7, No. 7, pp. 2260-2272. Jul. 2007.*

* cited by examiner

*Primary Examiner* — Stuart Hendrickson
*Assistant Examiner* — Richard M Rump
(74) *Attorney, Agent, or Firm* — Akerman Senterfitt; Michael K. Dixon

(57) ABSTRACT

We disclose a process to produce carbon nanotubes from microalgae. Microalgae is been utilized for biodiesel production. The algal membrane resulted from oil extraction of microalgae is used here to produce carbon nanotubes. The process utilized for the conversion is composed of two steps, in the first step the algal membrane is converted to carbon black through a pyrolysis process in inert atmosphere, in the second step the resulted carbon black is converted to carbon nanotubes by mixing the carbon black with a fluid with known self ignition condition and subjecting the mix to said self ignition condition.

20 Claims, 7 Drawing Sheets

US 8,057,776 B2

PROCESS TO PRODUCE CARBON NANOTUBES FROM MICROALGAE

FIELD OF THE INVENTION

This invention relates to a process to produce carbon nanotubes from microalgae.

BACKGROUND OF THE INVENTION

Photosynthetic organisms such as microalgae are being utilized to produce biodiesel by converting organic molecules to lipids that can then be converted to biodiesel. These photosynthetic organisms are far from monolithic. Biologists have categorized microalgae in a variety of classes, mainly distinguished by their pigmentation, life cycle and basic cellular structure. The four most important (at least in terms of abundance) are: The diatoms (Bacillariophyceae), green algae (Chlorophyceae), blue-green algae (Cyanophyceae) and the golden algae (Chrysophyceae).

Microalgae are a primitive form of plants. Microalgae grow in aquatic environments. Microalgae, like higher plants, produce storage lipids in the form of triacyglycerols (TAGs). Although TAGs could be used to produce of a wide variety of chemicals, in here we will focus on the production of fatty acid methyl esters (FAMEs), which can be used as a substitute for fossil-derived diesel fuel. This fuel, known as biodiesel, can be synthesized from TAGs via a simple transesterification reaction in the presence of acid or base and methanol. Biodiesel can be used in unmodified diesel engines, and has advantages over conventional diesel fuel in that it is renewable, biodegradable, and produces less $SO_x$ and particulate emissions when burned.

The algal membrane resulted from the extraction of lipids has been proposed for different uses such as animal feed or plant nutrients. When unconventional algal feed such as sewage are used for the microalgae growth, the membrane cannot be easily utilized as animal feed without further treatment.

This invention is disclosing a process to convert the algae membrane to carbon nanotubes. Conventional methods for production of carbon nanotubes include chemical vapor deposition, laser ablation and arc discharge methods. All of these methods require pure carbon source for the production of carbon nanotubes (see Graham et al. U.S. Pat. No. 7,635,867 and Liu et al. U.S. Pat. No. 7,625,544)

This invention utilizes the algae membrane as a source for nanotubes production.

SUMMARY OF THE INVENTION

This invention relates to process for production of carbon nanotubes using algae as source material. The algae membrane is converted to carbon black using a pyrolysis process. The carbon black is then mixed with a substance, preferably in liquid form, with known self-ignition conditions. The carbon black is then is placed in a sealed chamber. The chamber is then promoted to the self-ignition condition. Upon the ignition of the substance in the chamber, without external flam, the energy released from the ignition produces carbon nanotubes out of the carbon black. The process is repeated to increase the purity of the produced carbon nanotubes.

DESCRIPTION OF THE INVENTION

Figure 1:
FIG. 1 Microscopic image showing algal membrane following oil extraction

Before disclosing embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a chamber" includes a mixture of two or more chambers, and the like.

As used in this specification and the appended claims, microalgae and algae describes the microorganism used in this invention to convert its content to carbon nanotubes.

The invention describes a process that converts waste of biodiesel production into carbon nanotubes. The aspects of the invention pertain a process that yields the maximum amount of carbon nanotubes generated from carbonated waste material.

In a preferred embodiment of this invention the source material are intact algae before oil extraction. In another preferred embodiment the source material is algal membrane obtained after oil extraction. In yet another preferred embedment of this invention the source material is a carbon rich waste product such as rubber, plastics, wood, biomass, dry sewage, jojoba shells, etc.

The source material such as algae is processed in heating chamber under inert atmosphere to produce carbon black; the heating scheme utilized in the pyrolysis process is at high rate, such as 10-50° C./min. In another embodiment the heating rate can be slow at 1-10° C./min. The heating chamber used in the heating process is a closed container that can sustain the heating process. In another embodiment the heating source is from a solar source. The chamber is maintained at inert condition during the heating process.

The carbon black is mixed with a substance that has manageable auto-ignition conditions. Though the mixing ratio between the auto-ignition substance and the carbon black is function of the amount of energy release generated from the auto-ignition substance, a preferred mixing ratio is 100-200 ml for auto ignition substance to 1 kg of carbon black.

Auto-ignition substances operate under different pressure and temperature conditions. Though these conditions are known to experts in the field, a tabulated list is presented to show the auto-ignition conditions for some of the compounds.

| | Auto ignition temperature ° C. at | | | |
|---|---|---|---|---|
| Compound | 1 bar | 2 bar | 5 bar | 10 bar |
| n-Hexane | 230 | 235 | 210 | 197 |
| n-Heptane | 220 | 201 | 197 | 190 |
| n-Octane | 215 | | 210 | |
| Benzene | 565 | 526 | 470 | 451 |
| Methanol | 440 | | 283 | 250 |
| Ethanol | 400 | | 283 | 250 |
| Acetone | 525 | 350 | 275 | 260 |
| Dioxan | 375 | 212 | 197 | 189 |

The prepared carbon black is then placed in a sealed chamber. The chamber is prompted to the auto-ignition condition of the mixed substance. Once the chamber reaches the auto-ignition condition a noise marking the auto-ignition condition will be generated. The chamber is then allowed to cool down to room temperature. The sample is then taken to quantify the formation of carbon nanotubes. The process of bringing the chamber to auto-ignition condition can be repeated, depending on the purity of the generated carbon nanotubes, i.e two repeated operations increases the purity of the generated carbon nanotubes. The purity formed carbon nanotubes out of a single operation is between 70-80% and for double operations between 75-85%.

In order to enhance the purity of formed carbon nanotubes, purification by wet or dry techniques can be utilized. In the wet techniques oxidizing agents as those described in the literature such as $H_2O_2$, can be utilized to increase the sample purity. Following this technique the purity reached 90%. Another technique that is disclosed in this invention is the use of ionic liquid to increase the purity of the formed carbon nanotubes. In dry technique slow burning process is utilized to increase the purity of the formed carbon nanotubes.

EXAMPLE

Figure 2:
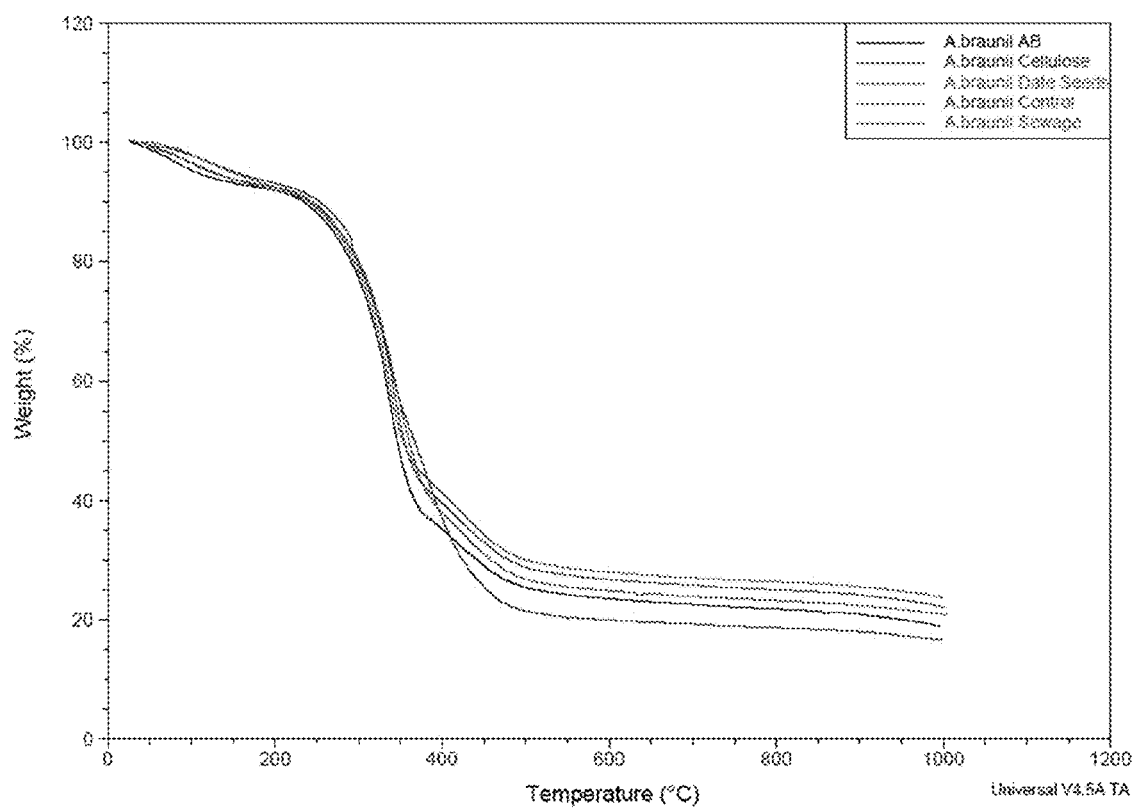
FIG. 2 Thermogravitmetric analyses showing the formation of carbon black when pyrolysis process is performed on the algal membrane. Algae was obtained following different feeding schemes; sewage, cellulose, etc.
Figure 3:
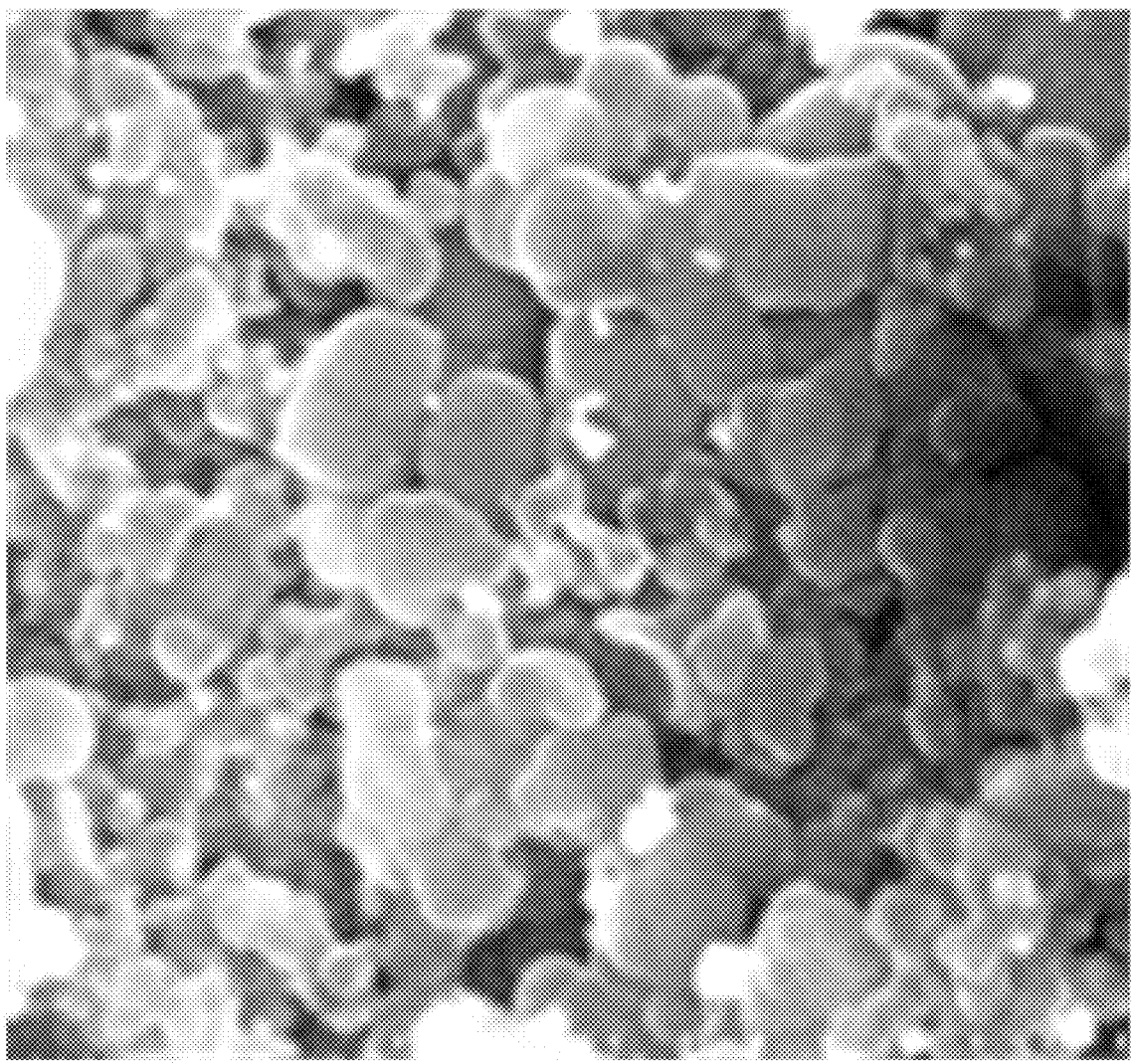
FIG. 3 SEM monograph showing carbon black particulates
Figure 4:
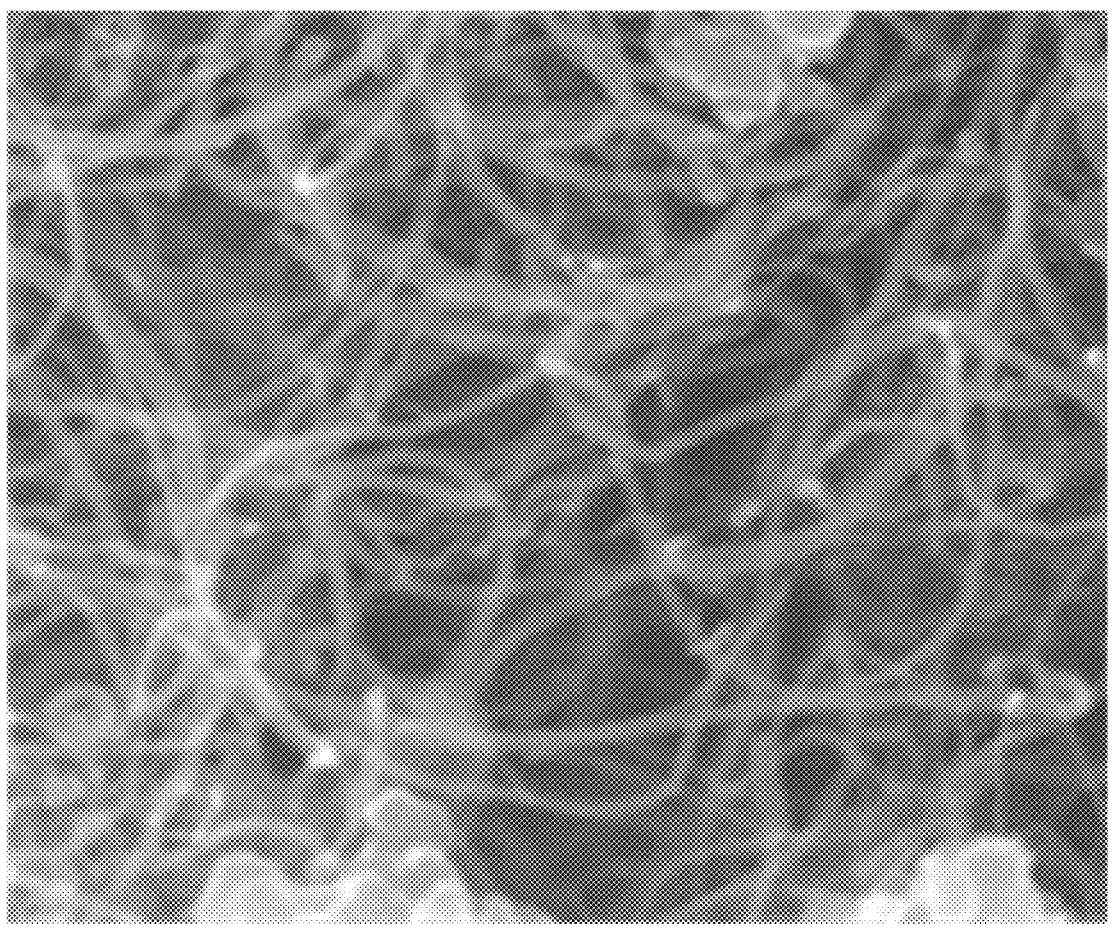
FIG. 4 SEM monograph showing the formation of carbon nanotubes.
Figure 5:
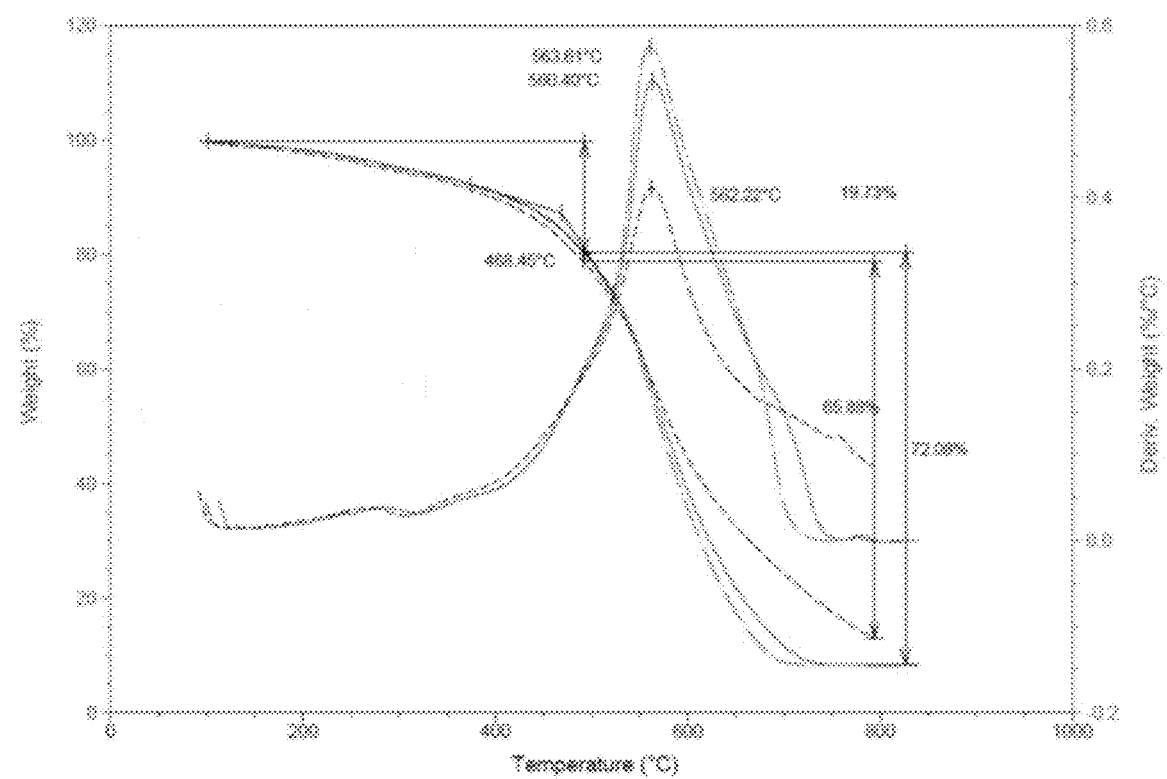
FIG. 5 Thermogravitmetric analyses showing the purity of carbon nanotubes. The carbon nanotubes are estimated at 72%.
Figure 6:
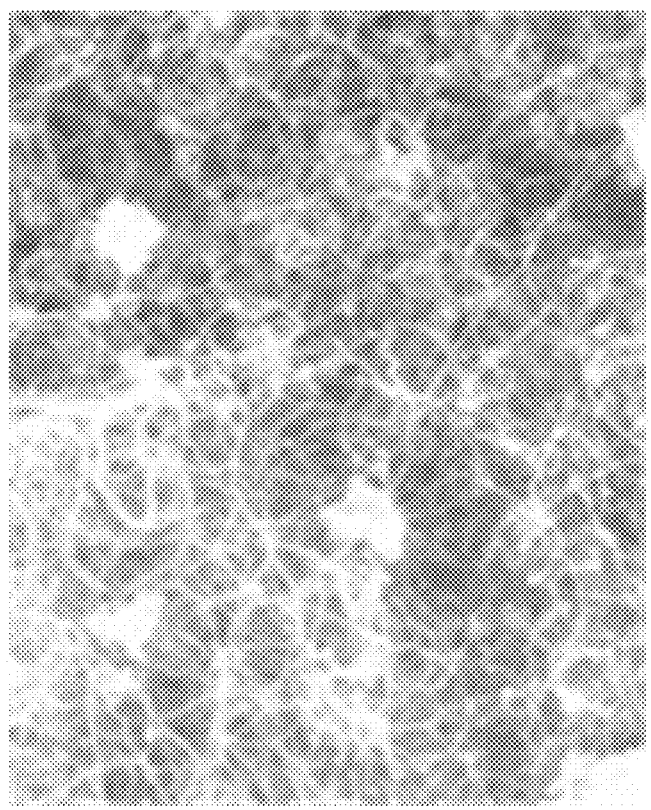
FIG. 6 SEM monograph of purified carbon nanotubes
Figure 7:
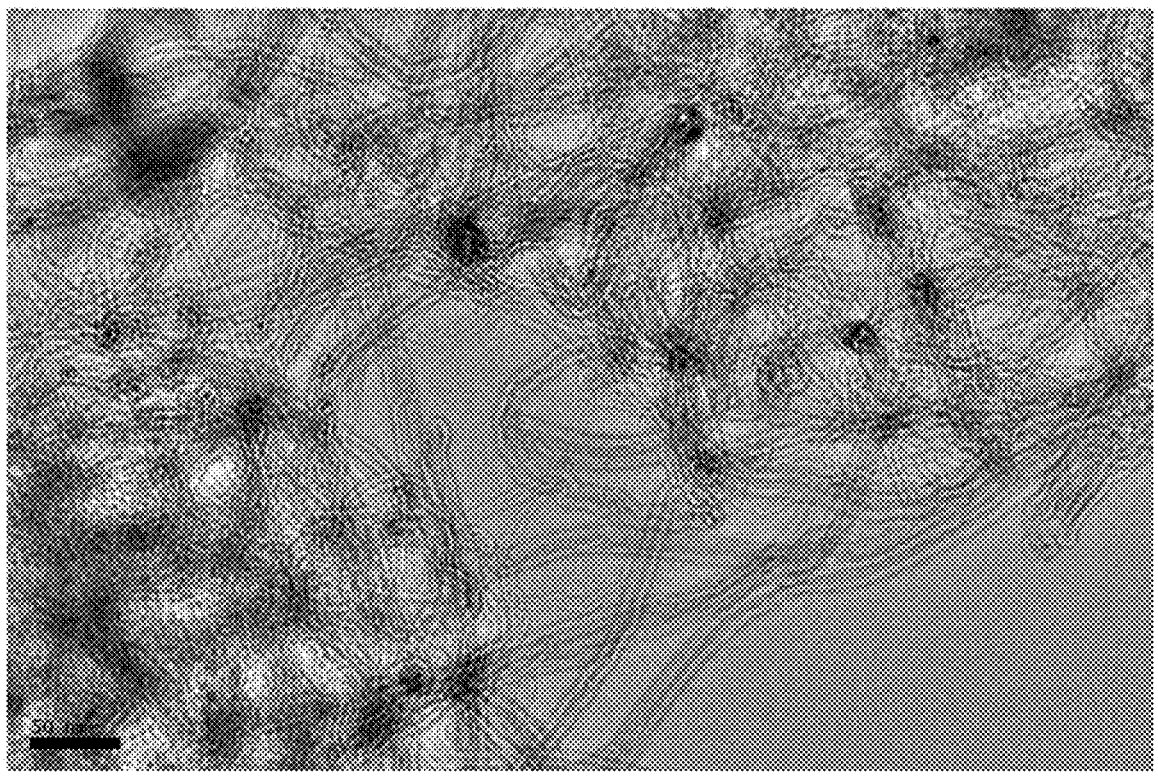
FIG. 7 TEM monograph showing the purified carbon nanotubes.

In one preferred mix, carbon black generated from burning microalgae membrane (FIG. 1) in inert conditions. FIG. 2 shows the carbon black generated when burning microalgae membrane in nitrogen environment. FIG. 3 shows a scanning electron microscopy monograph of the generated carbon black. A kilogram of carbon black is mixed with 200 milliliter of ethanol then placed in a sealed chamber. The chamber pressure and temperature were raised to 10 bars and 250° C. using an external propane burner. When the ethanol auto-ignited a noise is generated in the chamber and sudden drop in the pressure is observed. The chamber was then allowed to cool to room temperature using natural cooling. The sample was then taken out of the chamber for analysis. FIG. 4 shows scanning electron micrograph of the formed carbon nanotubes. The purity of the formed carbon nanotubes is evaluated using thermogravitmetric analysis as shown in FIG. 5. The purity was estimated to be 75%. Ionic liquid made by mixing two fatty acids (capric acid ($C_{10}H_{20}O_2$) and lauric acid ($C_{12}H_{24}O_2$)) was utilized to purify the carbon nanotubes. FIG. 6 shows scanning electron microscope monographs of purified carbon nanotubes. FIG. 7 shows transmission electron microscope of purified carbon nanotubes.

The invention claimed is:

1. A method of forming carbon nanotubes from microalgae, comprising:
    heating microalgae in an inert atmosphere to form carbon black;
    mixing the carbon black with at least one auto-ignition substance; and
    converting the carbon black to carbon nanotubes in a sealed chamber by heating a mixture of the carbon black and the auto-ignition substance.

2. The method of claim 1, wherein the carbon nanotubes include at least one multiwall carbon nanotube.

3. The method of claim 1, further comprising purifying the carbon nanotubes via a dry purification method.

4. The method of claim 3, wherein purifying the carbon nanotubes via a dry purification method comprises heating the unpurified nanotubes to above 500 degrees Celsius.

5. The method of claim 1, further comprising purifying the carbon nanotubes via a wet purification method.

6. The method of claim 5, wherein purifying the carbon nanotubes via a wet purification method comprises purifying the carbon nanotubes with an ionic liquid.

7. The method of claim 6, wherein purifying the carbon nanotubes via a wet purification method comprises purifying the carbon nanotubes with an ionic liquid that is a mix of fatty acids.

8. The method of claim 6, wherein purifying the carbon nanotubes via a wet purification method comprises purifying the carbon nanotubes with an ionic liquid at room temperature.

9. The method of claim 6, wherein purifying the carbon nanotubes via a wet purification method comprises purifying the carbon nanotubes with at least one oxidizing agent.

10. The method of claim 6, wherein purifying the carbon nanotubes via a wet purification method comprises purifying the carbon nanotubes with at least one acid.

11. A method of forming carbon nanotubes from microalgae, comprising:
    heating microalgae in an inert atmosphere to form carbon black;
    mixing the carbon black with at least one auto-ignition substance;
    converting the carbon black to carbon nanotubes in a sealed chamber by heating a mixture of the carbon black and the auto-ignition substance; and
    purifying the carbon nanotubes via a dry purification method.

12. The method of claim 11, wherein the carbon nanotubes include at least one multiwall carbon nanotube.

13. The method of claim 11, wherein purifying the carbon nanotubes via a dry purification method comprises heating the unpurified nanotubes to above 500 degrees Celsius.

14. A method of forming carbon nanotubes from microalgae, comprising:
    heating microalgae in an inert atmosphere to form carbon black;
    mixing the carbon black with at least one auto-ignition substance;
    converting the carbon black to carbon nanotubes in a sealed chamber by heating a mixture of the carbon black and the auto-ignition substance; and
    purifying the carbon nanotubes via a wet purification method.

15. The method of claim 14, wherein the carbon nanotubes include at least one multiwall carbon nanotube.

16. The method of claim 14, wherein purifying the carbon nanotubes via a wet purification method comprises purifying the carbon nanotubes with an ionic liquid.

17. The method of claim 14, wherein purifying the carbon nanotubes via a wet purification method comprises purifying the carbon nanotubes with an ionic liquid that is a mix of fatty acids.

18. The method of claim 14, wherein purifying the carbon nanotubes via a wet purification method comprises purifying the carbon nanotubes with an ionic liquid at room temperature.

19. The method of claim 14, wherein purifying the carbon nanotubes via a wet purification method comprises purifying the carbon nanotubes with at least one oxidizing agent.

20. The method of claim 14, wherein purifying the carbon nanotubes via a wet purification method comprises purifying the carbon nanotubes with at least one acid.

* * * * *